(12) United States Patent
Zhang et al.

(10) Patent No.: US 12,373,655 B2
(45) Date of Patent: Jul. 29, 2025

(54) MACHINE TRANSLATION METHOD AND APPARATUS, DEVICE AND STORAGE MEDIUM

(71) Applicant: BEIJING BAIDU NETCOM SCIENCE TECHNOLOGY CO., LTD., Beijing (CN)

(72) Inventors: Ruiqing Zhang, Beijing (CN); Hui Liu, Beijing (CN); Zhongjun He, Beijing (CN); Zhi Li, Beijing (CN); Hua Wu, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 272 days.

(21) Appl. No.: 18/122,316

(22) Filed: Mar. 16, 2023

(65) Prior Publication Data

US 2023/0342561 A1    Oct. 26, 2023

(30) Foreign Application Priority Data

Apr. 26, 2022   (CN) .......................... 202210465501.1

(51) Int. Cl.
*G06F 40/00*     (2020.01)
*G06F 40/47*     (2020.01)
*G06F 40/51*     (2020.01)

(52) U.S. Cl.
CPC .............. *G06F 40/47* (2020.01); *G06F 40/51* (2020.01)

(58) Field of Classification Search
CPC .......... G06F 40/47; G06F 40/51; G06F 40/44; G06F 40/58; G06F 40/289; G06F 40/42;
(Continued)

(56) References Cited

U.S. PATENT DOCUMENTS

| 2018/0300317 | A1* | 10/2018 | Bradbury | ................. G06N 3/08 |
| 2021/0312144 | A1* | 10/2021 | Mizushima | ............. G06F 40/58 |
| 2022/0245362 | A1* | 8/2022 | Nizar | ..................... G06F 40/216 |
| 2023/0050134 | A1* | 2/2023 | Biswas | .................. G06N 3/047 |

FOREIGN PATENT DOCUMENTS

| CN | 108763222 A | 11/2018 |
| CN | 110443346 A | 11/2019 |

(Continued)

OTHER PUBLICATIONS

Lu, Yu et al, "Attention Calibration for Transformer in Neural Machine Translation", Aug. 6, 2021, Association of Computational Linguistics, Proceedings of the 59th Annual Meeting of the Association for Computational Linguistics and the 11th International Joint Conference on NLP, 1288-1298. (Year: 2021).*

(Continued)

*Primary Examiner* — Edgar X Guerra-Erazo
(74) *Attorney, Agent, or Firm* — Brooks Kushman P.C.

(57) ABSTRACT

A machine translation method includes: obtaining first target language text by performing first translation on source language text using an initial NMT model; identifying an untranslated part in the source language text based on the source language text and the first target language text; obtaining an adjusted NMT model by increasing an attention weight corresponding to the untranslated part in the initial NMT mode; and obtaining second target language text by performing second translation on the source language text using the adjusted NMT model.

13 Claims, 5 Drawing Sheets

(58) Field of Classification Search
CPC .......... G06F 40/40; G06F 40/45; G06F 40/55; G06F 40/56; G06F 40/20; G06F 40/263; G06F 40/284; G06F 40/279; G06F 40/295; G06F 16/353; G06F 16/3347; G06N 3/08; G06N 20/00; G06N 20/10; G06N 20/20; G06N 3/045; G06N 3/0455; G06N 5/022; G06N 3/084; G06N 3/0895; G06N 3/04; G06N 3/048; G06N 3/088; G06N 3/09; G06N 3/091; G06N 3/092; G06N 3/094; G06N 3/096; G06N 3/098; G06N 3/0985; G10L 15/005; G10L 15/16
See application file for complete search history.

(56) References Cited

FOREIGN PATENT DOCUMENTS

| CN | 111160036 | A |   | 5/2020 |   |
|---|---|---|---|---|---|
| CN | 112926345 | A |   | 6/2021 |   |
| CN | 113392657 | A | * | 9/2021 | ............. G06F 40/58 |
| CN | 113408306 | A |   | 9/2021 |   |
| JP | 2019096303 | A |   | 6/2019 |   |
| JP | 2022114144 | A |   | 8/2022 |   |
| WO | WO-2019019916 | A1 | * | 1/2019 | ............. G06F 40/44 |
| WO | WO-2019107623 | A1 | * | 6/2019 |   |
| WO | 2022118604 | A1 |   | 6/2022 |   |

OTHER PUBLICATIONS

P. Shah and V. Bakrola, "Neural Machine Translation System of Indic Languages—An Attention based Approach," 2019 Second International Conference on Advanced Computational and Communication Paradigms (ICACCP), Gangtok, India, 2019, pp. 1-5. (Year: 2019).*

Y. Lu, J. Zhang, J. Zeng, S. Wu and C. Zong, "Attention Analysis and Calibration for Transformer in Natural Language Generation," in IEEE/ACM Transactions on Audio, Speech, and Language Processing, vol. 30, pp. 1927-1938, 2022. (Year: 2022).*

Notice of Reasons for Refusal of Japanese patent application No. 2023001658 issued Apr. 2, 2024, 5 pages.

* cited by examiner

MACHINE TRANSLATION METHOD AND APPARATUS, DEVICE AND STORAGE MEDIUM

CROSS-REFERENCE TO RELATED APPLICATION

The present disclosure claims the priority and benefit of Chinese Patent Application No. CN202210465501.1, filed on Apr. 26, 2022, entitled "MACHINE TRANSLATION METHOD AND APPARATUS, DEVICE AND STORAGE MEDIUM". The disclosure of the above application is incorporated herein by reference in its entirety.

TECHNICAL FIELD

The present disclosure relates to the field of computer technologies, and particularly relates to the field of artificial intelligence, such as a natural language processing technology, a deep learning technology, or the like, and particularly to a machine translation method, a device and a storage medium.

BACKGROUND

Machine translation (MT) refers to conversion of source language text into target language text. The MT may be classified into neural MT (Neural Machine Translation, NMT) and statistical MT (Statistical Machine Translation, SMT). The NMT is generally performed based on an attention mechanism.

Due to limitations of the attention mechanism, the NMT tends to cause translation missing, thus affecting a translation effect.

SUMMARY

The present disclosure provides a machine translation method, a device and a storage medium.

According to an aspect of the present disclosure, there is provided a machine translation method, including: obtaining first target language text by performing first translation on source language text using an initial neural machine translation (NMT) model; identifying an untranslated part in the source language text based on the source language text and the first target language text; obtaining an adjusted NMT model by increasing an attention weight corresponding to the untranslated part in the initial NMT model; and obtaining second target language text by performing second translation on the source language text using the adjusted NMT model.

According to another aspect of the present disclosure, there is provided an electronic device, including: at least one processor; and a memory connected with the at least one processor communicatively, the memory stores instructions executable by the at least one processor to enable the at least one processor to perform the method according to any one of the above-mentioned aspects.

According to another aspect of the present disclosure, there is provided a non-transitory computer readable storage medium with computer instructions stored thereon, the computer instructions are used for causing a computer to perform the method according to any one of the above-mentioned aspects.

It should be understood that the statements in this section are not intended to identify key or critical features of the embodiments of the present disclosure, nor limit the scope of the present disclosure. Other features of the present disclosure will become apparent from the following description.

BRIEF DESCRIPTION OF THE DRAWINGS

The drawings are used for better understanding the present solution and do not constitute a limitation of the present disclosure. In the drawings.

DETAILED DESCRIPTION OF EMBODIMENTS

The following part will illustrate exemplary embodiments of the present disclosure with reference to the drawings, including various details of the embodiments of the present disclosure for a better understanding. The embodiments should be regarded only as exemplary ones. Therefore, those skilled in the art should appreciate that various changes or modifications can be made with respect to the embodiments described herein without departing from the scope and spirit of the present disclosure. Similarly, for clarity and conciseness, the descriptions of the known functions and structures are omitted in the descriptions below.

An NMT model based on an attention mechanism does not translate character by character, but translates after a whole sentence is input and understood by the model, such that partial content may be untranslated due to a defect of the attention mechanism of the model, which is particularly obvious for a long sentence.

In order to improve a machine translation effect, the present disclosure provides the following embodiments.

Figure 1:
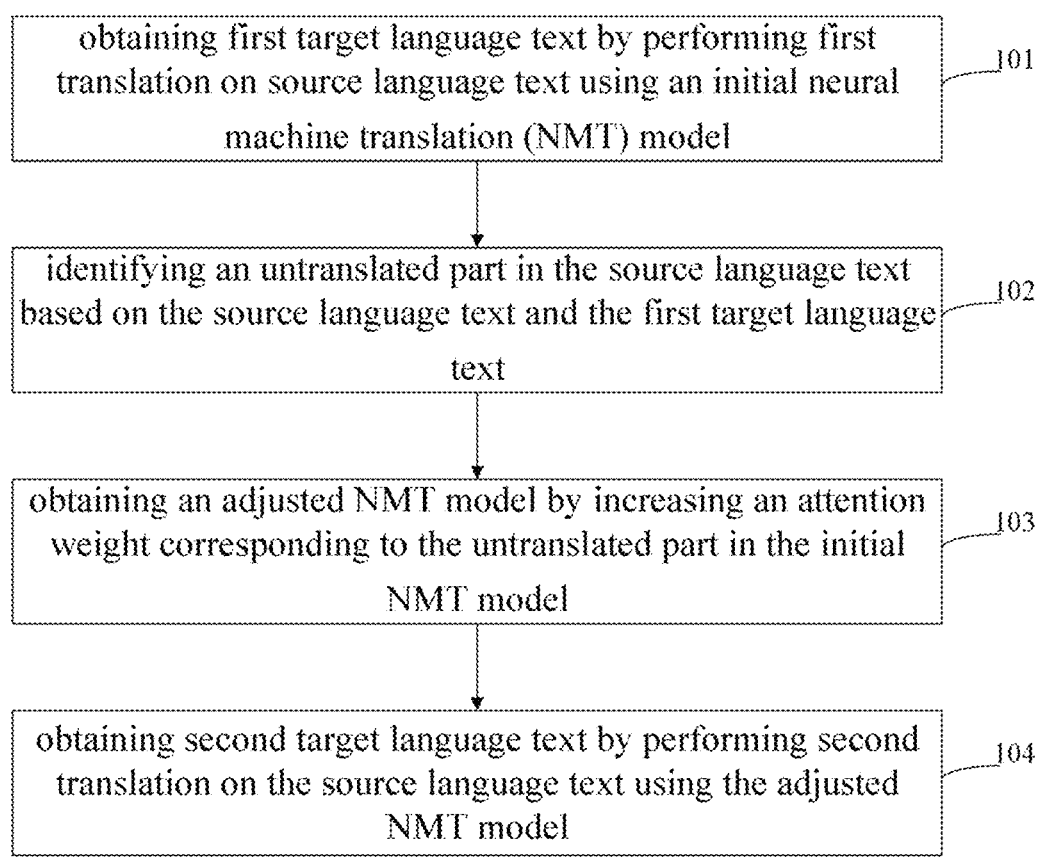
FIG. 1 is a schematic diagram according to a first embodiment of the present disclosure.

FIG. 1 is a schematic diagram according to a first embodiment of the present disclosure. This embodiment provides a machine translation method, including:

101: obtaining first target language text by performing first translation on source language text using an initial neural machine translation (NMT) model;

102: identifying a untranslated part in the source language text based on the source language text and the first target language text;

103: obtaining an adjusted NMT model by increasing an attention weight corresponding to the untranslated part in the initial NMT model; and 104: obtaining second target language text by performing second translation on the source language text using the adjusted NMT model.

In this embodiment, a structure of translation missing detection and retranslation is adopted on the whole to reduce a translation missing phenomenon and improve the machine translation effect.

The first target language text refers to a translation result obtained after the first translation; the second target language text refers to a translation result obtained after the second translation (i.e., retranslation).

The untranslated part in the source language text may be in units of text units; that is, the missed text units in the source language text may be identified.

For example, the text is Chinese text, and the text units of the Chinese text may be words. Correspondingly, the untranslated part of the source language text refers to untranslated words in the source language text.

The attention mechanism is adopted in most NMT models; specifically, the NMT model may include an attention layer, and the attention layer may determine an attention weight of each text unit in the text, and perform a weighting operation on a feature corresponding to each text unit based on the attention weight. Specific content of the attention mechanism may be realized using the related art.

In a translation scenario, the above-mentioned text refers to the source language text. For example, a source language is Chinese, and the text unit may refer to a word.

Therefore, based on the untranslated word, the attention weight corresponding to the word in the source language text in the NMT model may be adjusted, particularly increased.

For the sake of distinction, the NMT model corresponding to the first translation may be referred to as an initial NMT model, and the adjusted NMT model may be referred to as an adjusted NMT model.

After the adjusted NMT model is obtained, the source language text may be retranslated using the adjusted NMT model.

It may be appreciated that the above-mentioned translation missing detection and retranslation may be performed multiple times. For example, after the second target language text is obtained, the translation missing detection and retranslation may be performed again until a preset number of iterations are reached.

Assuming that the preset iteration number is 2, that is, two times of translation are performed, the second target language text may be used as a final translation result of the source language text.

In this embodiment, by identifying the untranslated part, increasing the attention weight of the untranslated part in the initial NMT model, and performing the second translation on the source language text, attention to the untranslated part may be increased during the second translation, thereby reducing translation missing situations and improving the machine translation effect.

In order to better understand the embodiments of the present disclosure, an application scenario to which the embodiments of the present disclosure are applied is described.

Figure 2:
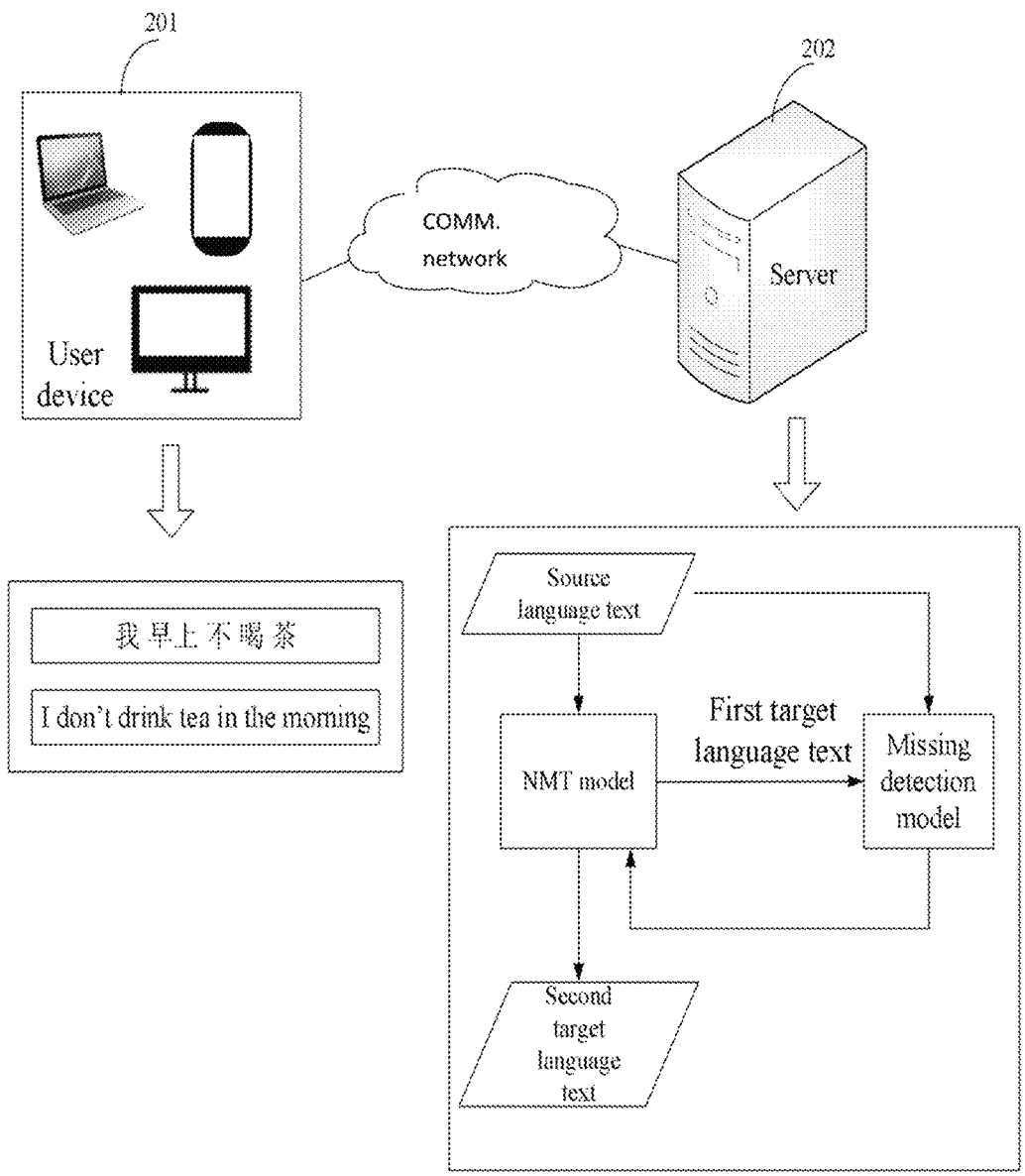
FIG. 2 is a schematic diagram of an application scenario for implementing a machine translation method according to an embodiment of the present disclosure.

FIG. 2 is a schematic diagram of an application scenario for implementing the machine translation method according to the embodiment of the present disclosure. In this embodiment, for example, voice recognition is performed in a server.

As shown in FIG. 2, devices involved in the application scenario may include: a user device 201 and a server 202. The user device 201 and the server 202 interact with each other using a communication network. The user device may include a mobile device (for example, a mobile phone, a portable computer, or the like), a smart home device (for example, a smart speaker, a smart television, or the like), a smart wearable device (for example, a smart watch, a smart bracelet, or the like), or the like. The server may be a local server or a cloud server. The communication network may be a wide area network, a local area network, the Internet, or any other public or private network or a combination thereof.

During machine translation, the user device 201 may send a source language text to the server 202, the server 202 translates the source language text using a machine translation model to obtain a translation result, the translation result is a target language text, and then, the server 202 feeds the target language text back to the user device 201, and the user device 201 may display the target language text to a user through a user interface (UI).

For example, the source language text is Chinese characters read "wo zao shang bu he cha", and as shown in FIG. 2, the obtained corresponding target language text is "I don't drink tea in the morning".

In this embodiment, a machine translation part of the server may include: an NMT model and a translation missing detection model. The NMT model is configured to convert the source language text into the target language text, input is the source language text, and output is the target language text; in this embodiment, taking two times of translation as an example, corresponding translation results are referred to as first target language text and second target language text respectively. The translation missing detection model is configured to detect an untranslated part in the source language text, input of the translation missing detection model is the source language text and the first target language text, and output thereof is identification information of the untranslated part in the source language text, such that the untranslated part may be determined based on the identification information. An attention weight in the NMT model may be adjusted based on the untranslated part of the source language text.

It may be understood that, for example, the server performs machine translation in this embodiment, but if the user device has a machine translation capability, machine translation may also be performed locally on the user device.

The embodiment of the present disclosure is described as follows in conjunction with the application scenario shown in FIG. 2.

Figure 3:
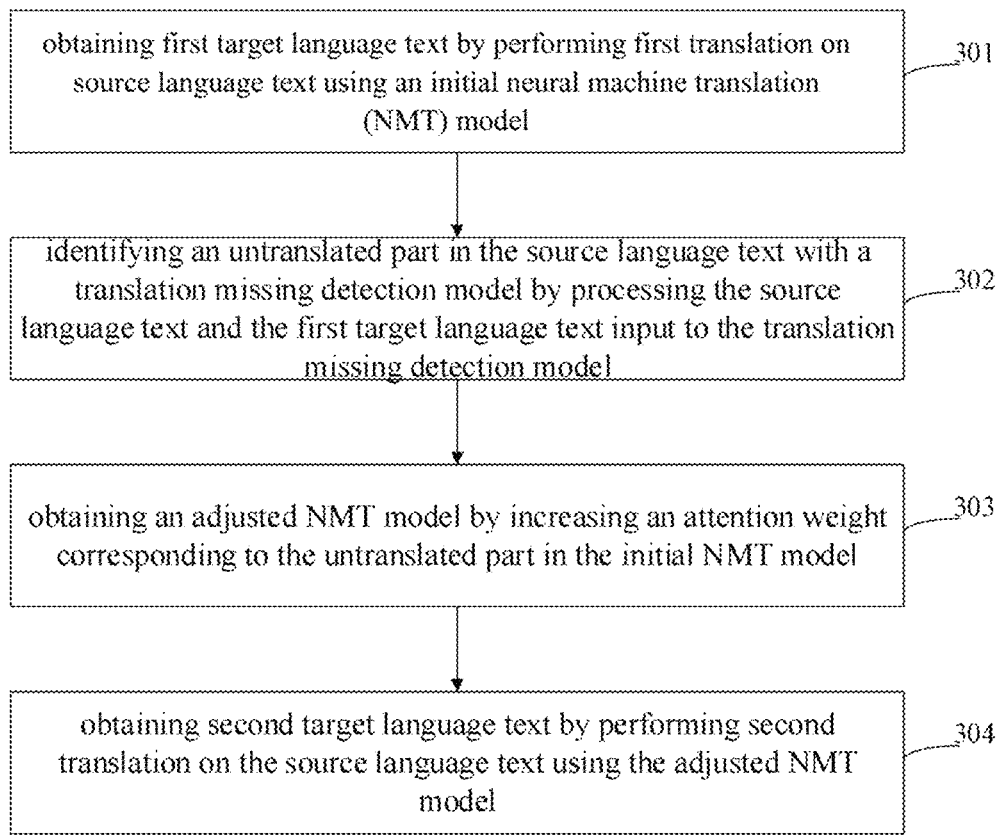
FIG. 3 is a schematic diagram according to a second embodiment of the present disclosure.

FIG. 3 is a schematic diagram according to a second embodiment of the present disclosure; as shown in FIG. 3, a method according to this embodiment includes:
  301: obtaining first target language text by performing first translation on source language text using an initial NMT model.
  302: identifying an untranslated part in the source language text with a translation missing detection model by processing the source language text and the first target language text input to the translation missing detection model.

Figure 4:
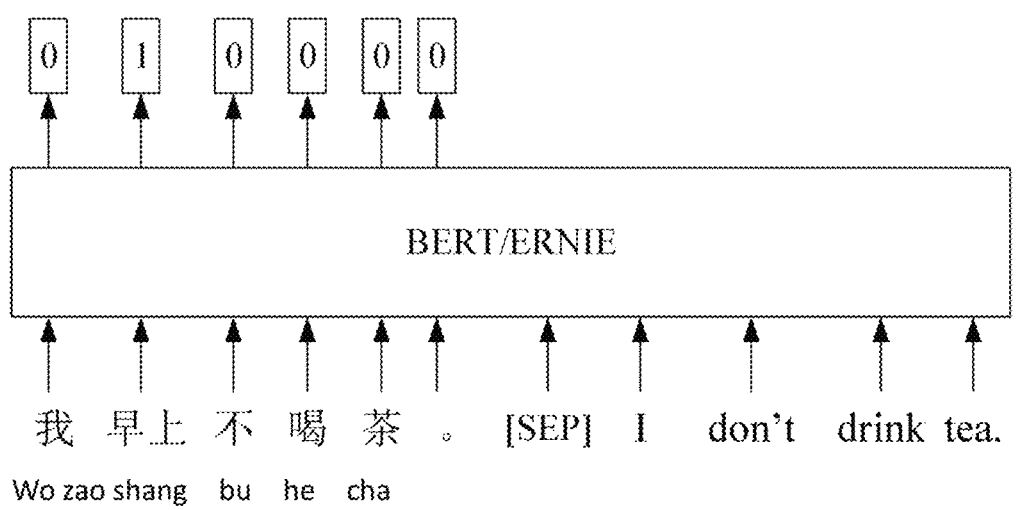
FIG. 4 is a schematic diagram of a translation missing detection model in an embodiment of the present disclosure.

FIG. 4 shows a schematic diagram of the translation missing detection model, input of the model is the source language text and the target language text corresponding to the source language text, and output thereof is identification information of the untranslated part in the source language text. Then, the untranslated part may be identified based on the identification information.

For example, the source language text is Chinese characters read "wo zao shang bu he cha", and the target language text is "I don't drink tea". Assuming that identification information "1" indicates that a corresponding word is untranslated, and identification information "0" indicates that a corresponding word is translated, based on the above example, the identification information 01000 as shown in FIG. 4 may be output; that is, the second word (i.e., Chinese characters read "zao shang") in the source language text is untranslated.

In this embodiment, the identification information corresponding to each text unit in the source language text may be obtained using the translation missing detection model, and the identification information is used to identify whether the corresponding text unit is untranslated, such that the untranslated part in the source language text may be identified based on the identification information. Since the model generally has a good detection performance, accuracy of detection of the untranslated part in the source language text may be improved when the model is adopted to identify the untranslated part.

In addition, during specific processing, the words may include punctuation, such as the full stop as shown in FIG. 4.

Additionally, during input, the source language text and the target language text may be separated using a separator denoted by [SEP].

A backbone structure of the translation missing detection model may be a related pre-trained model, as shown in FIG. 4, which may be a Bidirectional Encoder Representations from Transforms (BERT) model or an Enhanced Representation from kNowledge IntEgration (ERNIE) model.

The translation missing detection model may be pre-trained, training data thereof includes input samples and a missing tag, the input samples includes a translation pair, the translation pair includes source language text and target language text, and the missing tag is used for identifying whether each text unit in the source language text is untranslated.

The training data may be generated using a data fabricating method which may specifically include: acquiring a first source language sample and a first target language sample; performing content augmentation on the first target language sample to obtain a second target language sample; obtaining a second source language sample based on the second target language sample; taking the second source language sample and the first target language sample as the input samples; and comparing the second source language sample with the first source language sample to determine the missing tag.

The first source language sample and the first target language sample form one translation pair which may be represented by (x, y), x being the first source language sample and y being the first target language sample.

The first source language sample and the first target language sample may be obtained in an existing sample set, for example, x=Chinese characters read "wo bu he cha", y="I don't drink tea".

Then, the first target language sample may be subjected to the content augmentation to obtain the second target language sample which may be denoted by y'.

Figure 5:
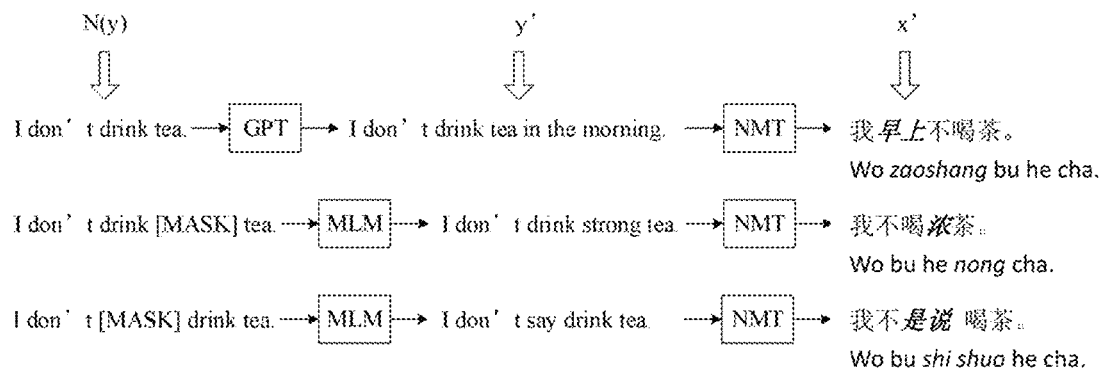
FIG. 5 is a schematic diagram of an augmentation process of training data of the translation missing detection model in an embodiment of the present disclosure.

The content augmentation may be implemented using a pre-trained model; for example, referring to FIG. 5, the first target language sample may be subjected to the content augmentation using a Generative Pre-Training (GPT) model and/or a Masked Language Model (MLM). As shown in FIG. 5, for the GPT model, the first target language sample y may be used as input N(y) of the GPT model, and the second target language sample y' may be output after processing by the GPT model. For the MLM, the first target language sample may be masked; for example, a [MASK] mark is randomly added, the text to which the [MASK] mark is added is used as input N(y) of the MLM, and the second target language sample y' may be output after processing by the MLM.

After the second target language sample is obtained, the second target language sample y' may be translated back into a source language; for example, referring to FIG. 5, a target language is English, the source language is Chinese, and an NMT model may be used to translate English y' back into Chinese text which may be referred to as the second source language text x'.

Then, (x', y) may be taken as a pair of input samples; x' is compared with x to determine the missing tag of a word in x'; specifically, the missing tag of a word in x' which does not exist in x may be labeled as "1" (indicating that translation missing occurs), and the missing tags of the rest words are labeled as "0". For example, as shown in FIG. 5, the missing tags of the italicized words (Chinese characters read "zao shang"" in the first row, "Chinese characters read "nong"" in the second row, and "Chinese characters read "shi shun")" in the third row) are labeled as "1".

In this embodiment, the training data of the translation missing detection model may be generated using the data fabricating method, such that more training data may be obtained under a condition of a small number of existing samples, thus improving an effect of the translation missing detection model.

303: obtaining an adjusted NMT model by increasing an attention weight corresponding to the untranslated part in the initial NMT model.

The attention weight may correspond to each word.

This step may specifically include: determining a maximum attention weight in the initial NMT model; reducing the maximum attention weight, and determining a difference value of the attention weight to be attenuated before and after the reduction; and adding the difference value to the attention weight corresponding to the untranslated part.

Figure 6:
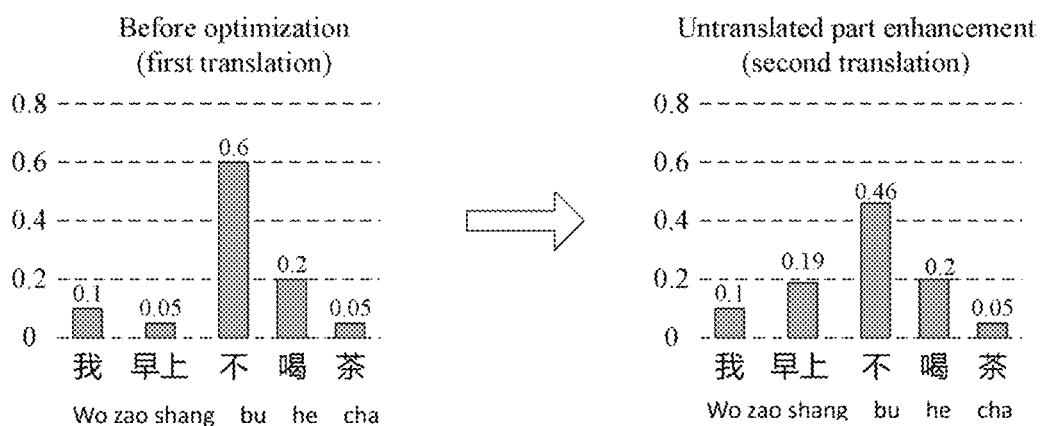
FIG. 6 is a schematic diagram of attention weights before and after adjustment of an NMT model in an embodiment of the present disclosure.

For example, as shown in FIG. 6, it is assumed that the attention weights corresponding to the words of the initial NMT model are shown on the left side of FIG. 6. The maximum attention weight is 0.6, 0.6 may be reduced, and a specific rule of the reduction may be set; for example, formula $p'=p^{1.5}$ may be used to perform calculation, p' is the attention weight after the reduction, and p is the attention weight before the reduction. For example, a reduced value of 0.6 is equal to $0.6^{1.5}$=0.46.

As shown on the right side of FIG. 6, after the maximum attention weight is reduced, the difference value (0.6−0.46=0.14) thereof may be added to the attention weight corresponding to the untranslated part "Chinese characters read "zao shang"", and therefore, after adjustment, the attention weight corresponding to "Chinese characters read "zao shang"" is equal to 0.05+0.14=0.19.

In this embodiment, by adding the difference value corresponding to the maximum attention weight in the initial NMT model to the attention weight corresponding to the untranslated part, the maximum attention weight may be attenuated, and the attention weight corresponding to the untranslated part may be increased, thus improving the machine translation effect.

In addition, if the untranslated part includes a plurality of text units, the to-be-added value corresponding to each of the plural text units may be determined based on standard normal distribution and the difference value; the to-be-added value corresponding to each text unit is added to the attention weight corresponding to the text unit.

For example, if the untranslated part is 3 consecutive words, a value corresponding to each of the 3 words may be determined using the standard normal distribution N(0,1); that is, a sum of the values corresponding to the 3 words is the above-mentioned difference value, and the three values conform to the standard normal distribution centered on the middle value in the 3 untranslated words. Then, the to-be-added value corresponding to each word is added to the attention weight of the corresponding word.

In this embodiment, the to-be-added values of the untranslated parts are balanced using the standard normal distribution, such that attention of the untranslated parts may conform to an objective distribution condition, thus improving the machine translation effect.

304: obtaining second target language by performing second translation on the source language text using the adjusted NMT model.

For example, after the attention weight of the word "Chinese characters read "zao shang"" is increased, "Chinese characters read "wo zao shang bu he cha"" may be retranslated.

Then, the second target language text may be used as the final translation result, or the above-mentioned translation missing detection and retranslation may be performed multiple times, and a translation result after a preset number of iterations is used as the final translation result.

In this embodiment, the NMT model may be adjusted from the perspective of the attention mechanism of the NMT by increasing the attention weight corresponding to the untranslated part, which fundamentally overcomes the defect of the attention mechanism of the NMT model, thus reducing the translation missing situations and improving the machine translation effect.

Figure 7:
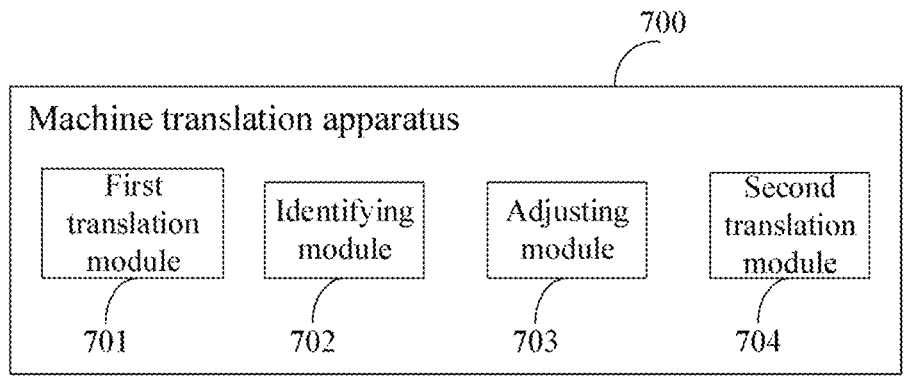
FIG. 7 is a schematic diagram according to a third embodiment of the present disclosure.

FIG. 7 is a schematic diagram according to a third embodiment of the present disclosure, which provides a machine translation apparatus. As shown in FIG. 7, the machine translation apparatus 700 includes a first translation module 701, an identifying module 702, an adjusting module 703 and a second translation module 704.

The first translation module 701 is configured to obtain first target language text by performing first translation on source language text using an initial NMT model; the identifying module 702 is configured to identify an untranslated part in the source language text based on the source language text and the first target language text; the adjusting module 703 is configured to obtain an adjusted NMT model by increasing an attention weight corresponding to the untranslated part in the initial NMT model; and the second translation module 704 is configured to obtain second target language etxt by performing second translation on the source language text using the adjusted NMT model.

In this embodiment, by identifying the untranslated part, increasing the attention weight of the untranslated part in the initial NMT model, and performing the second translation on the source language text, attention to the untranslated part may be increased during the second translation, thereby reducing translation missing situations and improving a machine translation effect.

In some embodiments, the identifying module 702 is further configured to: output identification information with a translation missing detecting model by processing the source language text and the first target language text input to the translation missing detection model, the identification information being used for identifying whether a text unit in the source language text is untranslated; and identify the untranslated part in the source language text based on the identification information.

In this embodiment, the identification information corresponding to each text unit in the source language text may be obtained using the translation missing detection model, and the identification information is used to identify whether the corresponding text unit is untranslated, such that the untranslated part in the source language text may be identified based on the identification information. Since the model generally has a good detection performance, accuracy of detection of the untranslated part in the source language text may be improved when the model is adopted to identify the untranslated part.

In some embodiments, the translation missing detection model is obtained based on training data, the training data includes input samples and a missing tag, and the training data is generated by: acquiring a first source language sample and a first target language sample; performing content augmentation on the first target language sample to obtain a second target language sample; obtaining a second source language sample based on the second target language sample; taking the second source language sample and the first target language sample as the input samples; and comparing the second source language sample with the first source language sample to determine the missing tag.

In this embodiment, the training data of the translation missing detection model may be generated using a data fabricating method, such that more training data may be obtained under a condition of a small number of existing samples, thus improving an effect of the translation missing detection model.

In some embodiments, the adjusting module 703 is further configured to: determine a maximum attention weight in the initial NMT model; reduce the maximum attention weight, and determine a difference value of the maximum attention weight before and after the reduction; and add the difference value to the attention weight corresponding to the untranslated part.

In this embodiment, by adding the difference value corresponding to the maximum attention weight in the initial NMT model to the attention weight corresponding to the untranslated part, the maximum attention weight may be attenuated, and the attention weight corresponding to the untranslated part may be increased, thus improving the machine translation effect.

In some embodiments, if the untranslated part includes a plurality of text units, the adjusting module is further configured to: determine a to-be-added value corresponding to each of the plural text units based on standard normal distribution and the difference value; and add the to-be-added value corresponding to each text unit to the attention weight corresponding to the text unit.

In this embodiment, the to-be-added values of the untranslated parts are balanced using the standard normal distribution, such that attention of the untranslated parts may conform to an objective distribution condition, thus improving the machine translation effect.

It may be understood that in the embodiments of the present disclosure, mutual reference may be made to the same or similar contents in different embodiments.

It may be understood that "first", "second", or the like, in the embodiments of the present disclosure are only for distinguishing and do not represent an importance degree, a sequential order, or the like.

In the technical solution of the present disclosure, the collection, storage, usage, processing, transmission, provision, disclosure, or the like, of involved user personal information are in compliance with relevant laws and regulations, and do not violate public order and good customs.

According to the embodiment of the present disclosure, there are also provided an electronic device, a readable storage medium and a computer program product.

Figure 8:
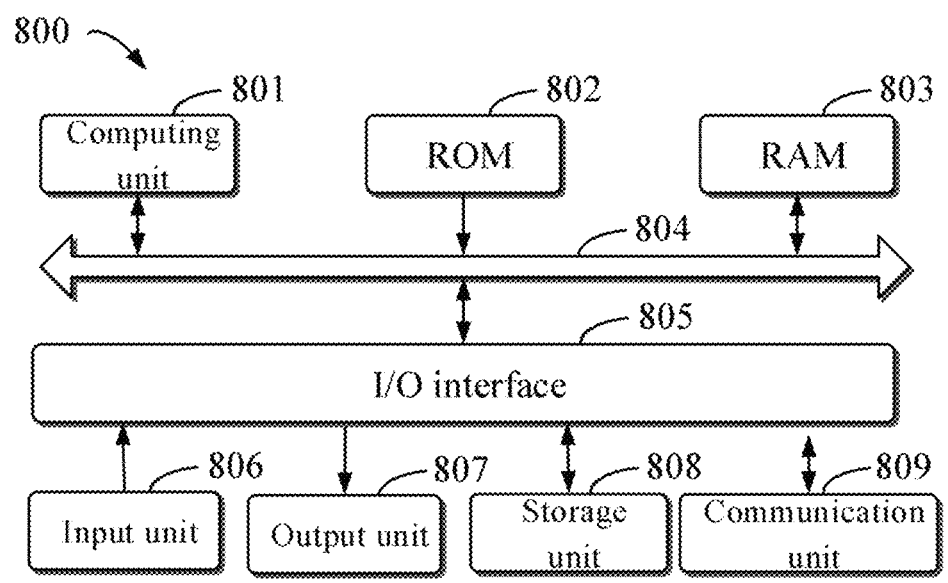
FIG. 8 is a schematic diagram of an electronic device configured to implement the machine translation method according to embodiments of the present disclosure.

FIG. 8 shows a schematic block diagram of an exemplary electronic device 800 which may be configured to implement the embodiment of the present disclosure. The electronic device 800 is intended to represent various forms of digital computers, such as laptop computers, desktop computers, workstations, servers, blade servers, mainframe computers, and other appropriate computers. The electronic device 800 may also represent various forms of mobile apparatuses, such as personal digital assistants, cellular telephones, smart phones, wearable devices, and other similar computing apparatuses. The components shown herein, their connections and relationships, and their functions, are meant to be exemplary only, and are not meant to limit implementation of the present disclosure described and/or claimed herein.

As shown in FIG. 8, the electronic device 800 includes a computing unit 801 which may perform various appropriate actions and processing operations according to a computer program stored in a read only memory (ROM) 802 or a computer program loaded from a storage unit 808 into a random access memory (RAM) 803. Various programs and data necessary for the operation of the electronic device 800 may be also stored in the RAM 803. The computing unit 801, the ROM 802, and the RAM 803 are connected with one other through a bus 804. An input/output (I/O) interface 805 is also connected to the bus 804.

The plural components in the electronic device 800 are connected to the I/O interface 805, and include: an input unit 806, such as a keyboard, a mouse, or the like; an output unit 807, such as various types of displays, speakers, or the like; the storage unit 808, such as a magnetic disk, an optical disk, or the like; and a communication unit 809, such as a network card, a modem, a wireless communication transceiver, or the like. The communication unit 809 allows the electronic device 800 to exchange information/data with other devices through a computer network, such as the Internet, and/or various telecommunication networks.

The computing unit 801 may be a variety of general and/or special purpose processing components with processing and computing capabilities. Some examples of the computing unit 801 include, but are not limited to, a central processing unit (CPU), a graphic processing unit (GPU), various dedicated artificial intelligence (AI) computing chips, various computing units running machine learning model algorithms, a digital signal processor (DSP), and any suitable processor, controller, microcontroller, or the like. The computing unit 801 performs the methods and processing operations described above, such as the machine translation method. For example, in some embodiments, the machine translation method may be implemented as a computer software program tangibly contained in a machine readable medium, such as the storage unit 808. In some embodiments, part or all of the computer program may be loaded and/or installed into the electronic device 800 via the ROM 802 and/or the communication unit 809. When the computer program is loaded into the RAM 803 and executed by the computing unit 801, one or more steps of the machine translation method described above may be performed. Alternatively, in other embodiments, the computing unit 801 may be configured to perform the machine translation method by any other suitable means (for example, by means of firmware).

Various implementations of the systems and technologies described herein above may be implemented in digital electronic circuitry, integrated circuitry, field programmable gate arrays (FPGA), application specific integrated circuits (ASIC), application specific standard products (ASSP), systems on chips (SOC), complex programmable logic devices (CPLD), computer hardware, firmware, software, and/or combinations thereof. The systems and technologies may be implemented in one or more computer programs which are executable and/or interpretable on a programmable system including at least one programmable processor, and the programmable processor may be special or general, and may receive data and instructions from, and transmit data and instructions to, a storage system, at least one input apparatus, and at least one output apparatus.

Program codes for implementing the method according to the present disclosure may be written in any combination of one or more programming languages. These program codes may be provided to a processor or a controller of a general purpose computer, a special purpose computer, or other programmable data processing apparatuses, such that the program code, when executed by the processor or the controller, causes functions/operations specified in the flowchart and/or the block diagram to be implemented. The program code may be executed entirely on a machine, partly on a machine, partly on a machine as a stand-alone software package and partly on a remote machine, or entirely on a remote machine or a server.

In the context of the present disclosure, the machine readable medium may be a tangible medium which may contain or store a program for use by or in connection with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the foregoing. More specific examples of the machine readable storage medium may include an electrical connection based on one or more wires, a portable computer disk, a hard disk, a random access memory (RAM), a read only memory (ROM), an erasable programmable read only memory (EPROM or flash memory), an optical fiber, a portable compact disc read only memory (CD-ROM), an optical storage device, a magnetic storage device, or any suitable combination of the foregoing.

To provide interaction with a user, the systems and technologies described here may be implemented on a computer having: a display apparatus (for example, a cathode ray tube (CRT) or liquid crystal display (LCD) monitor) for displaying information to a user; and a keyboard and a pointing apparatus (for example, a mouse or a trackball) by which a user may provide input for the computer. Other kinds of apparatuses may also be used to provide interaction with a user; for example, feedback provided for a user may be any form of sensory feedback (for example, visual feedback, auditory feedback, or tactile feedback); and input from a user may be received in any form (including acoustic, speech or tactile input).

The systems and technologies described here may be implemented in a computing system (for example, as a data server) which includes a back-end component, or a computing system (for example, an application server) which includes a middleware component, or a computing system (for example, a user computer having a graphical user interface or a web browser through which a user may interact with an implementation of the systems and technologies described here) which includes a front-end component, or a computing system which includes any combination of such back-end, middleware, or front-end components. The components of the system may be interconnected through any form or medium of digital data communication (for example, a communication network). Examples of the communication network include: a local area network (LAN), a wide area network (WAN) and the Internet.

A computer system may include a client and a server. Generally, the client and the server are remote from each other and interact through the communication network. The relationship between the client and the server is generated by virtue of computer programs which run on respective computers and have a client-server relationship to each other. The server may be a cloud server, also called a cloud computing server or a cloud host, and is a host product in a cloud computing service system, so as to overcome the defects of high management difficulty and weak service expansibility in conventional physical host and virtual private server (VPS) service. The server may also be a server of a distributed system, or a server incorporating a blockchain.

It should be understood that various forms of the flows shown above may be used and reordered, and steps may be added or deleted. For example, the steps described in the present disclosure may be executed in parallel, sequentially, or in different orders, which is not limited herein as long as the desired results of the technical solution disclosed in the present disclosure may be achieved.

The above-mentioned implementations are not intended to limit the scope of the present disclosure. It should be understood by those skilled in the art that various modifications, combinations, sub-combinations and substitutions may be made, depending on design requirements and other factors. Any modification, equivalent substitution and improvement made within the spirit and principle of the present disclosure all should be included in the extent of protection of the present disclosure.

What is claimed is:

1. A machine translation method, comprising:
obtaining first target language text by performing first translation on source language text using an initial neural machine translation (NMT) model, wherein the source language text is a first sentence of a first language, and the first target language text is a second sentence of a second language different from the first language, which is obtained by translation of entire first sentence;
identifying an untranslated part in the source language text based on the source language text and the first target language text, comprising: inputting the source language text and the first target language text to a translation missing detection model; outputting by the translation missing detection model identification information being used for identifying whether a text unit in the source language text is untranslated; and identifying the untranslated part in the source language text based on the identification information;
obtaining an adjusted NMT model by increasing an attention weight corresponding to the untranslated part in the initial NMT model; and
obtaining second target language text by performing second translation on the source language text using the adjusted NMT model, wherein the second target language text is a third sentence of the second language,
wherein the translation missing detection model is obtained based on training data, the training data comprises input samples and a training missing tag, and the training data is generated by:
acquiring a first source language sample and a first target language sample translated from the first source language sample;
performing content augmentation on the first target language sample to obtain a second target language sample;
obtaining a second source language sample by reverse translation of the second target language sample;
taking the second source language sample and the first target language sample as the input samples; and
comparing the second source language sample with the first source language sample to determine the training missing tags.

2. The method of claim 1, wherein the identification information comprises a missing tag corresponding to an untranslated text unit and non-missing tags corresponding to translated text units.

3. The method of claim 1, wherein the training missing tag corresponds to a text unit included in the second source language sample but not included in the first source language sample.

4. The method of claim 1, wherein performing content augmentation on the first target language sample to obtain the second target language sample comprises:
inputting the first target language sample to a generative pre-training model, and
outputting, by the generative pre-training model, the second target language sample with more words compared with the first target language sample.

5. The method of claim 1, wherein performing content augmentation on the first target language sample to obtain the second target language sample comprises:
adding randomly a mask in the first target language sample, and inputting the first target language sample with the mask added into a masked language model; and
outputting, by the masked language model, the second target language sample with the mask being replaced with a text unit.

6. The method of claim 1, wherein increasing the attention weight corresponding to the untranslated part in the initial NMT model comprises:
determining a maximum attention weight in the initial NMT model;
reducing the maximum attention weight, and determining a difference value of the maximum attention weight before and after the reduction; and
adding the difference value to the attention weight corresponding to the untranslated part.

7. The method of claim 6, wherein in a case that the untranslated part comprises a plurality of text units, the adding the difference value to the attention weight corresponding to the untranslated part comprises:
determining a to-be-added value corresponding to each of the plural text units based on standard normal distribution and the difference value; and
adding the to-be-added value corresponding to each text unit to the attention weight corresponding to the text unit.

8. An electronic device, comprising:
at least one processor; and
a memory connected with the at least one processor communicatively;

wherein the memory stores instructions executable by the at least one processor to cause the at least one processor to perform a machine translation method comprising:

obtaining first target language text by performing first translation on source language text using an initial neural machine translation (NMT) model, wherein the source language text is a first sentence of a first language, and the first target language text is a second sentence of a second language different from the first language, which is obtained by translation of entire first sentence;

identifying an untranslated part in the source language text based on the source language text and the first target language text, comprising: inputting the source language text and the first target language text to a translation missing detection model; outputting by the translation missing detection model identification information being used for identifying whether a text unit in the source language text is untranslated; and identifying the untranslated part in the source language text based on the identification information;

obtaining an adjusted NMT model by increasing an attention weight corresponding to the untranslated part in the initial NMT model; and obtaining second target language text by performing second translation on the source language text using the adjusted NMT model, wherein the second target language text is a third sentence of the second language, wherein the translation missing detection model is obtained based on training data, the training data comprises input samples and a training missing tag, and the training data is generated by:

acquiring a first source language sample and a first target language sample translated from the first source language sample;

performing content augmentation on the first target language sample to obtain a second target language sample;

obtaining a second source language sample by reverse translation of the second target language sample;

taking the second source language sample and the first target language sample as the input samples; and comparing the second source language sample with the first source language sample to determine the training missing tags.

9. The electronic device of claim 8, wherein increasing the attention weight corresponding to the untranslated part in the initial NMT model comprises:

determining a maximum attention weight in the initial NMT model;

reducing the maximum attention weight, and determining a difference value of the maximum attention weight before and after the reduction; and adding the difference value to the attention weight corresponding to the untranslated part.

10. The electronic device of claim 9, wherein in a case that the untranslated part comprises a plurality of text units, the adding the difference value to the attention weight corresponding to the untranslated part comprises:

determining a to-be-added value corresponding to each of the plural text units based on standard normal distribution and the difference value; and adding the to-be-added value corresponding to each text unit to the attention weight corresponding to the text unit.

11. A non-transitory computer readable storage medium storing computer instructions for causing a computer to perform a machine translation method comprising:

obtaining first target language text by performing first translation on source language text using an initial neural machine translation (NMT) model, wherein the source language text is a first sentence of a first language, and the first target language text is a second sentence of a second language different from the first language, which is obtained by translation of entire first sentence;

identifying an untranslated part in the source language text based on the source language text and the first target language text, comprising: inputting the source language text and the first target language text to a translation missing detection model; outputting by the translation missing detection model identification information being used for identifying whether a text unit in the source language text is untranslated; and identifying the untranslated part in the source language text based on the identification information;

obtaining an adjusted NMT model by increasing an attention weight corresponding to the untranslated part in the initial NMT model; and obtaining second target language text by performing second translation on the source language text using the adjusted NMT model, wherein the second target language text is a third sentence of the second language, wherein the translation missing detection model is obtained based on training data, the training data comprises input samples and a training missing tag, and the training data is generated by:

acquiring a first source language sample and a first target language sample translated from the first source language sample;

performing content augmentation on the first target language sample to obtain a second target language sample;

obtaining a second source language sample by reverse translation of the second target language sample;

taking the second source language sample and the first target language sample as the input samples; and comparing the second source language sample with the first source language sample to determine the training missing tags.

12. The storage medium of claim 11, wherein increasing the attention weight corresponding to the untranslated part in the initial NMT model comprises:

determining a maximum attention weight in the initial NMT model;

reducing the maximum attention weight, and determining a difference value of the maximum attention weight before and after the reduction; and adding the difference value to the attention weight corresponding to the untranslated part.

13. The storage medium of claim 12, wherein in a case that the untranslated part comprises a plurality of text units, the adding the difference value to the attention weight corresponding to the untranslated part comprises:

determining a to-be-added value corresponding to each of the plural text units based on standard normal distribution and the difference value; and adding the to-be-added value corresponding to each text unit to the attention weight corresponding to the text unit.

\* \* \* \* \*